United States Patent
Edge

(10) Patent No.: US 7,738,148 B2
(45) Date of Patent: Jun. 15, 2010

(54) TECHNIQUES FOR PREDICTING COLORIMETRIC MEASUREMENTS OF MIXED SUBTRACTIVE COLORS

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 1127 days.

(21) Appl. No.: 11/375,349

(22) Filed: Mar. 14, 2006

(65) Prior Publication Data

US 2006/0262364 A1    Nov. 23, 2006

Related U.S. Application Data

(60) Provisional application No. 60/677,315, filed on May 3, 2005.

(51) Int. Cl.
*G03F 3/08* (2006.01)
*G03C 7/00* (2006.01)

(52) U.S. Cl. .................. 358/518; 358/1.1; 358/1.9; 430/358; 430/359

(58) Field of Classification Search .............. 358/1.9, 358/1.1, 3.26; 430/358, 359
See application file for complete search history.

(56) References Cited

U.S. PATENT DOCUMENTS 5,933,578 A * 8/1999 Van de Capelle et al. .... 358/1.9
7,215,343 B2 * 5/2007 Edge .......................... 345/604

FOREIGN PATENT DOCUMENTS

| EP | 0 613 062 A1 | 8/1994 |
| WO | WO 98/46008 A | 10/1998 |
| WO | WO 00/31960 A | 6/2000 |
| WO | WO/03/011604 A2 | 2/2003 |
| WO | WO 2004/068845 A1 | 8/2004 |
| WO | WO 2005/006737 A1 | 1/2005 |

* cited by examiner

*Primary Examiner*—King Y Poon
*Assistant Examiner*—Lawrence E Wills
(74) *Attorney, Agent, or Firm*—Nelson Adrian Blish

(57) ABSTRACT

This invention provides methods for predicting calorimetric measurements of subtractive colors, in particular, when there is a measurable colorimetric change in one or more individual colorant relative to a set of baseline measurements. The invention is useful for, among other things, imaging applications or soft proofing environments to improve color modeling without requiring significant empirical measurements for adjustments to color models.

1 Claim, 1 Drawing Sheet

TECHNIQUES FOR PREDICTING COLORIMETRIC MEASUREMENTS OF MIXED SUBTRACTIVE COLORS

CROSS-REFERENCE TO RELATED APPLICATION

This application claims the benefit of U.S. Provisional Application No. 60/677,315, filed May 3, 2005, the entire disclosure of which is hereby incorporated herein by reference.

FIELD OF THE INVENTION

This invention relates to color imaging. In particular, this invention pertains to accurately predicting the appearance of printed colors, generally, and accurately predicting the appearance of overprinted solid colors without full spectral information, specifically.

BACKGROUND OF THE INVENTION

It is common for the paper used for printing magazines to vary significantly location to location, lot to lot, vender to vender. Less frequently, ink may also shift in color properties. For very color critical jobs, the client whose job is bring printed may be obliged to personally view and sign-off on the color appearance of a job, due to moderate changes in color of paper or inks. Virtual proofing has the potential to enable a remote "color sign-off". However, one thing that is lacking from virtual proofing is the ability to predict how a color shift in one component such as paper or one of the CMYK inks will impact all the other colors which may be printed.

In the event of a paper or ink change, conventional techniques require measurements of large numbers of color patches to calculate and re-calculate color profiles. If the paper or ink changes, conventional wisdom mandates the re-calculation of color profiles, if color accuracy is needed. Moreover, many graphic design applications, like Adobe Illustrator™, do not accurately predict color output for overlapping similar transparent colors. This shortcoming is due to conventional graphic design applications' use of only CIELAB data when making their color predictions. For example, a graphic designer using a product like Adobe™ Illustrator™ may draw a logo or design using spot colors such as Pantone™. The graphic designer may choose to overlap different colored objects, enabling a "transparency" function of the graphic design application. If the colors are very different, such as yellow and cyan, the mixed result may look reasonable on display, as shown in FIG. 1. However, as shown in FIG. 2, if the two colors are identical or nearly identical (such as two cyans of slightly different shades) the overlapping region between the circles may look similar to each of the two circles, rather than appearing darker and more saturated, as one might expect. As can be seen, the addition of two colors each similar to Cyan=100% results in a color which is also essentially Cyan=100%, rather than a new color "Dark Cyan"=100%. This is because with only CIELAB data available, no estimate has been available for performing a more valid prediction.

Although algorithms have existed for many years for calculating resulting colors from mixing paints, dyes, etc., these algorithms have not been applicable to graphic design application. Generally, these calculations have been spectrally-based, meaning that full spectral information is required regarding both colorants and substrates in order to predict how they would add together to create a resulting color. For example, the Kubelka-Munk equation (Yang 2002) defines reflectance for multiple colorants on a paper substrate, where the colorants have both an absorption coefficient ($k(\lambda)$) and a scattering coefficient ($s(\lambda)$) as a function of wavelength $\lambda$.

$$R_a(\lambda, z_q) = \frac{(R_\infty - R_g)e^{-(1/R_\infty - R_\infty)sz} - R_\infty(1 - R_g R_\infty)}{R_\infty(R_\infty - R_g)e^{-(1/R_\infty - R_\infty)sz} - (1 - R_g R_\infty)}$$

where $R_g(\lambda)$ is the reflectance of the paper substrate, z is the colorant thickness, s is the same as the $s(\lambda)$ function, and $R_\infty(\lambda)$ is the reflectance of an infinitely thick colorant, calculated as follows:

$$R_\infty = 1 + \frac{k(\lambda)}{s(\lambda)} - \sqrt{\left(\frac{k(\lambda)}{s(\lambda)}\right)^2 + 2\frac{k(\lambda)}{s(\lambda)}}$$

One reason that these conventional calculations, such as the Kubelka-Munk equation, have not been applicable to graphic design applications is because such applications use ICC profiles to make their color predictions. These ICC profiles use CIELAB data and generally do not contain full spectral information. In this case, the above-discussed conventional calculations cannot easily be used for purposes of modifying profiles, updating profiles, or performing a priori mixing calculations on information obtained from ICC profiles.

Accordingly, a need in the art exists for efficiently and accurately predicting the appearance of mixed colors in the absence of full spectral information.

SUMMARY OF THE INVENTION

The above-described problems are addressed and a technical solution is achieved in the art by a system and a method for predicting calorimetric measurements of subtractive colors according to the present invention. In an embodiment of the present invention, calorimetric measurements of subtractive colors are predicted for a case where there is a measurable calorimetric change in one or more individual colorants relative to a set of baseline measurements. The invention is useful for, among other things, imaging applications or soft proofing environments to improve color modeling without requiring significant empirical measurements for adjustments to color models. More specifically, the invention is useful for, among other things, calculating new Neugebauer primaries based on changes in paper, cyan, magenta, yellow, or black ink, thereby allowing color profile recalculation based on minimal measurement data. In addition, the invention is useful for, among other things, estimating the additivity of subtractive colors in programs used in graphic illustration and design, such as predicting the overlapping region of two blue circles of slightly different hues with the "transparency" feature enabled in Adobe™ Illustrator™ or a similar graphic illustration program. The techniques may be implemented in software, in which case the invention may be directed to a computer-accessible memory comprising instructions that, when executed, perform the techniques described herein.

In one embodiment, the invention is directed to a method comprising converting baseline data for a paper base and a set of colorants from a device-independent color space to a device dependent color space; and generating transmittance vectors for the set of colorants by normalizing device-dependent values for the set of colorants to remove colorimetric effects of the paper base from the set of colorants.

In another embodiment, the invention is directed to a method comprising converting baseline data for a paper base, a set of colorants, and overprint data for one or more colorant combinations from a device-independent color space to a device dependent color space; generating transmittance vectors for the set of colorants by normalizing device-dependent values for the set of colorants to remove colorimetric effects of the paper base from the set of colorants; and using the transmittance vectors for estimation of subtractive color combinations.

In yet another embodiment, the invention is directed to a computer-accessible memory comprising instructions that upon execution cause one or more processors to convert baseline data for a paper base and a set of colorants from a device-independent color space to a device dependent color space; and generate transmittance vectors for the set of colorants by normalizing device-dependent values for the set of colorants to remove colorimetric effects of the paper base from the set of colorants.

In still yet another embodiment, the invention is directed to a computer-accessible memory comprising instructions that upon execution cause one or more processors to convert baseline data for a paper base, a set of colorants, and overprint data for one or more colorant combinations from a device-independent color space to a device dependent color space; generate transmittance vectors for the set of colorants by normalizing device-dependent values for the set of colorants to remove calorimetric effects of the paper base from the set of colorants; and use the transmittance vectors for estimation of subtractive color combinations.

In another embodiment, the invention provides a method comprising determining correction factors for overprint data based on estimated thickness adjustments of one or more colorant combinations, and applying the correction factors to image the overprint data.

In a further embodiment, the invention provides a computer-accessible memory comprising instructions that upon execution cause one or more processors to determine correction factors for overprint data based on estimated thickness adjustments of one or more colorant combinations, and apply the correction factors to image the overprint data.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

According to various embodiments of the present invention, a simplified version of Kubelka-Monk in conjunction with a non-continuous version of Bier's law for converting device independent data into device dependent data, such as RGB data, are used to provide a reasonable estimate for measured device independent data, such as CIELAB or CIEXYZ values, of mixed colorants on a substrate. According to embodiments of this invention, a reasonable baseline of original information is assumed, such as the information one normally finds in an ICC profile, combined with measurements that indicate shifts from the baseline, such as a change in paper color.

For those situations where there is no baseline information indicating the overprinting of different colors, such as for example a list of L*a*b* values for spot colors, the described techniques at least can provide a reasonably valid estimate for the mixing of solid colors, far better than current results in drawing applications.

Additionally, for packaging applications, the described techniques can give reasonable estimates for overprint colors based on accurate data for the individual colorants in conjunction with a baseline example for a particular printing press. Such reasonable estimates are useful because packaging customers often have difficulty performing color management for their work due to the fact that each job often has a different set of colorants. The techniques described herein assist in predicting color profiles on a per job basis with changing inks based on a baseline characterization. This can be very useful to packaging customers or anyone that needs very accurate color in print jobs.

Figure 1:
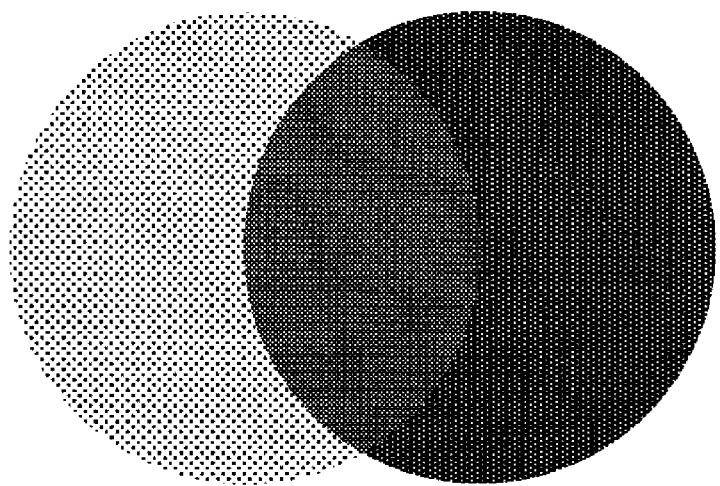
FIG. 1 illustrates a representation of an overlapping yellow and cyan dot.
Figure 2:
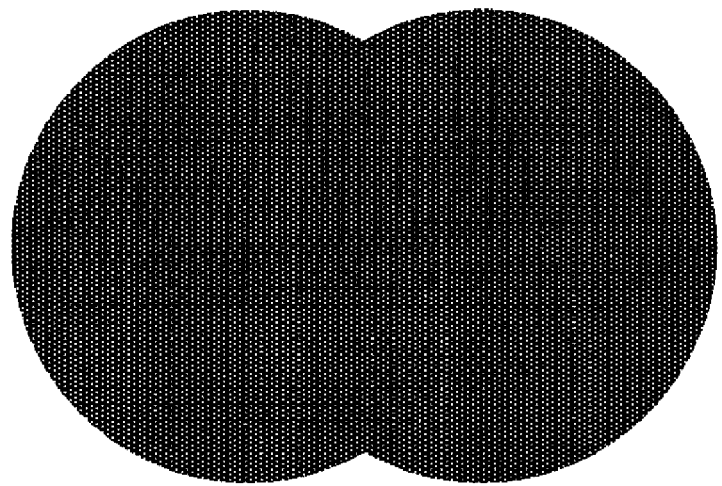
FIG. 2 illustrates a representation of overlapping dots of similar cyan colors according to conventional color prediction techniques.
Figure 3:
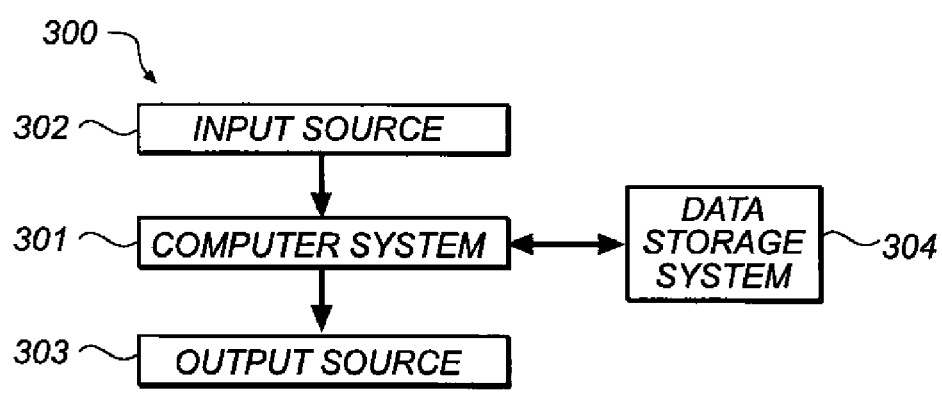
FIG. 3 illustrates a system for predicting colorimetric measurements of mixed subtractive colors, according to an embodiment of the present invention.

Turning now to FIG. 3, various embodiments of the present invention, described below, involve inventive data processing techniques that may be executed by a system 300. The system 300 includes a computer system 301, that itself may include one or more computers communicatively connected. The data required to execute the below-described data processing techniques may be provided to the computer system 301 from an input source 302 communicatively connected to the computer system 301. Although one skilled in the art will appreciate that the invention is not limited to any particular input source 302, such input source may include one or more user-interfaces, such as keyboards, mice, etc., other computers, or computer accessible memories that may have data stored therein or thereon. To facilitate executing the data processing techniques described below, the computer system 301 may have a data storage system 304 communicatively connected to it. The data storage system 304 may include one or more computer accessible memories. The output(s) generated by the computer system 301 as a result of executing the data processing techniques described below may be transmitted to an output source 303 communicatively connected to the computer system 301. Although one skilled in the art will appreciate that the invention is not limited to any particular output source 303, such output source 303 may include one or more display devices, other computers, or computer accessible memories that may have data stored therein or thereon. Accordingly, the output source 303 may be included, completely or partially, within the data-storage system 304. In this regard, the input source 302 may also be included, completely or partially, within the data-storage system 304.

The data-storage system 304 may be a distributed data-storage system including multiple computer-accessible memories communicatively connected via a plurality of computers and/or devices. On the other hand, the data storage system 304 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The term "computer" is intended to include any data processing device, such as a desktop computer, a laptop computer, a mainframe computer, a personal digital assistant, a Blackberry, and/or any other device for processing data, and/or managing data, and/or handling data, whether implemented with electrical and/or magnetic and/or optical and/or biological components, and/or otherwise.

The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between devices not located in computers at all. In this regard, although the data storage system 304 is shown separately from the computer system 301, one skilled in the art will appreciate that the data storage system 304 may be stored completely or partially within the computer system 301.

The data processing techniques, according to various embodiments of the present invention, begin with a simplified version of Kubelka-Munk, in which it is assumed that the scattering approaches 0. This implies that for a first order approximation, the colorants only absorb light, meaning that they are perfectly transparent (i.e. not opaque). This assumption implies that the ratio of absorption to scattering $k(\lambda)/s(\lambda)$ is nearly infinite, resulting in the following expression (also known as Bier's Law):

$$R_q(\lambda,z) = R_g(\lambda) e^{-k(\lambda)z} \qquad \text{Eq. 1}$$

If multiple colorants of thickness $z_i$ are combined, this may be extended to:

$$R_q(\lambda, z_0, z_1, z_2, \ldots) = R_g(\lambda) e^{-\Sigma k_i(\lambda) z_i} \qquad \text{Eq. 2}$$

where, for example, i denotes 0, 1, 2, 3 identifying cyan, magenta, yellow, and black. Since the ICC based standards used in the graphic arts are generally based on CIE systems which are inherently based on red, green, blue (or $\rho, \beta, \gamma$ in CIE terminology), the single continuous function of $\lambda$, $R_q(\lambda)$, which is based on an infinite set of possible values of $\lambda$, is replaced with a function of dimension 3 that predicts reflection for the red, green, blue areas of the visible spectrum:

$$R_j(z_0, z_1, z_2, \ldots) = R_{gj} e^{-\Sigma k_{ij} z_i} \qquad \text{Eq. 3}$$

where j=0, 1, 2 denotes red, green, and blue portions of the spectrum. This reflectance 3-D vector may be denoted as $R(z_0, z_1, z_2, \ldots)$. Although this embodiment of the present invention converts device independent coordinates into a discrete 3-dimensional RGB approximation of the visible spectrum, one skilled in the art will appreciate that other discrete approximations of the visible spectrum may be used.

Now, in actual printing there are complex interactions that occur: as one colorant prints over another colorant, the adhesion may be higher or lower than that of printing on the paper substrate. This phenomenon may be difficult to separate from effects such as scattering unless experimental data has been obtained to precisely determine and separate out these effects.

Assuming that such data may not be available, an embodiment of this invention proposes to combine the effects of all interactions into a simple correction factor. This correction factor may be for example in the form of an effective colorant thickness $z_i'$ which may be slightly different from the original value $z_i$. Hence value $z_i$ in the expression above is replaced with $$z_i' = z_i + \delta_i \qquad \text{Eq. 4}$$

where, as before, i denotes colorant and j denotes red, green, or blue part of the spectrum. The correction factor may account for colorant bonding differences of colorants deposited upon other colorants relative to colorants deposited directly on a paper base, as indicated above. Moreover, the same or similar correction factor may also be used to account for colorant impurities. The term "paper base" is generally used herein to refer to any substrate or surface on which colorants may be deposited.

Note that the exponential expression in equation 3 above may be regarded as the transmittance property of each colorant as a function of its thickness $z_i$:

$$T_{ij}(z_i) = e^{-k_{ij} z_i} \qquad \text{Eq. 5}$$

Combined with the correction indicated in equation 4 we have:

$$T_{ij}(z_i, \delta_i) = e^{-k_{ij}(z_i + \delta_i)}$$

$$T_{ij}(z_i, \delta_i) = T_{ij}(z_i) T_{ij}(\delta_i) \qquad \text{Eq. 6}$$

If it is assumed that baseline data contains CIELAB data for paper base, colorants, and overprints, the expression above may be rewritten in terms of a product of the reflectance of the baseline paper substrate and the negative exponentials of the colorant absorptions, modified by corrections caused by $\Delta z$ above:

$$R_j(z_0, \delta_0, z_1, \delta_1, z_2, \delta_2, z_3, \delta_3) = R_{gj} \prod_{i=0}^{i=3} T_{ij}(z_i) T_{ij}(\delta_i) \qquad \text{Eq. 7}$$

For simplicity, all of the $T_{ij}(\delta_i)$ corrections for a particular combination of colorants may be combined into a single correction factor $(1+\Delta j)$. This correction is valid only for that particular combination of individual colorants:

$$R_j(\Delta_j, z_0, \delta_0, z_1, \delta_1, z_2, \delta_2, z_3, \delta_3) = R_{gj}(1+\Delta_j) \prod_{i=0}^{i=3} T_{ij}(z_i) \qquad \text{Eq. 8}$$

Assuming that the value of transmission for a particular colorant will always be determined via measurement of paper and individual colorant printing on that paper, the above may further be simplified as functions purely of the change in paper and the empirically determined transmissions of each of the colorants, corrected by the overall delta for that particular combination of colorants:

$$R_j(\Delta_j) = R_{gj}(1+\Delta_j) \prod_{i=0}^{i=3} T_{ij} \qquad \text{Eq. 9}$$

The last mathematical conversion may be used to derive RGB from CIELAB values. This conversion may be performed using a simple matrix transformation—no tone curves are required since all the above calculations have been performed in linear RGB space, which may be converted directly from XYZ via matrix transformation:

$$\begin{pmatrix} X \\ Y \\ Z \end{pmatrix} = M \begin{pmatrix} R \\ G \\ B \end{pmatrix} \qquad \text{Eq. 10}$$

$$\begin{pmatrix} R \\ G \\ B \end{pmatrix} = M^{-1} \begin{pmatrix} X \\ Y \\ Z \end{pmatrix} \qquad \text{Eq. 11}$$

$$M = \begin{pmatrix} X_r & X_g & X_b \\ Y_r & Y_g & Y_b \\ Z_r & Z_g & Z_b \end{pmatrix} \qquad \text{Eq. 12}$$

The matrix used to convert between XYZ and RGB may be any reasonable space that contains the gamut of colorants: for CMYK inks for example, AdobeRGB with white point set to D50 illumination may be used.

Note that the RGB transmittance for any individual colorant may be derived from its measured CIELAB value by the expression:

$$R_{jMeas} = R_{gi} T_{ij}$$

$$T_{ij} = R_{jMeas}/R_{gj} \qquad \text{Eq. 13}$$

where $R_{gj}$ is the RGB vector converted from XYZ of the paper base converted directly to RGB according to the above and $R_{jMeas}$ is the RGB value converted from the measured XYZ of the colorant+paper together.

Likewise, the delta correction which combines all the interactions between colorants for a particular overprinted group of colorants, may be derived as follows:

$$R_{jMeas} = R_{gj}(1 + \Delta_j) \prod_{i=0}^{i=3} T_{ij} \qquad \text{Eq. 14}$$

$$\Delta_j = \left[ R_{jMeas} \bigg/ \left( R_{gj} \prod_{i=0}^{i=3} T_{ij} \right) \right] - 1$$

For measured colors that are a combination of paper base and more than one colorant, it is noted that if a particular colorant is missing (i.e. is 0%), that colorant will have no absorption k which means that $T_{ij}=1$ for that colorant "i"—i.e. it has no impact on the resulting final reflection.

Note that the determined values of $T_{ij}$ refer to individual colorants and $R_{gj}$ refers to the value of paper converted directly from the value of XYZ for the paper base.

If it is now assumed that new values of paper and/or colorant are measured and converted to $R'_{gi}$ for the paper and $T'_{ij}$ for the individual colorant according to Eq. 14 above, a new estimated value may be calculated for $R'_{jMeas}$.

$$R'_{jMeas} = R'_{gj}(1 + \Delta_j) \prod_{i=0}^{i=3} T_{ij} \qquad \text{Eq. 15}$$

Thus the procedure for predicting colors in this manner may be summarized as follows:

1) Convert all CIELAB values to CIEXYZ and from CIEXYZ to RGB using equation 11 above 2) Note that the RGB vector for the paper base $R_g$ is now determined directly from step 1

3) Determine the transmittance vectors $T_i$ from equation 13 for the remaining i colorants by normalizing out the values of the paper base vector $R_g$ as indicated by equation 13

4) Determine the overprint delta corrections $\Delta_j$ for each combination of overprints, (i.e. red, green, blue, 3/color, etc. according to equation 14 above).

Having determined values of $\Delta_j$ for each overprint color, it is noted that if all values of XYZ for paper and colorants remain unchanged, there will be no change to the calculated values $R_{jMeas}$. If a shift is detected for either paper or colorants or both, new values of $R'_{gi}$ for the paper and $T'_{ij}$ may be empirically determined and new values of $R'_{jMeas}$ may be calculated for each solid and overprint color. These estimated values of $R'_{jMeas}$ may be converted back to XYZ according to Eq. 10 above.

If there is no measured data available for a paper base or for any colorant, it is assumed that no change has occurred. In other words, the value of $R'_{gi}$ for the paper and $T'_{ij}$ for the colorants remains unchanged for any component for which there is no data.

Thus, if the only data offered for recalculating the solids and overprints is that of paper, the new values of first paper reflectance are calculated and new values of colorants may be calculated. This is particularly important for colors, such as a yellow, that tend to shift with a similar direction and magnitude as the shifts in paper due to its low degree of absorption for all colors other than blue.

For situations where no original overprint data exists, such as an illustration application painting with Pantone™ colors, equation 16 may be used with the value of $\Delta_j$ be set to 0, implying a perfect overprint and transparent mixing of the two colors. The overprinting of similar colors using transparency enabled will result in a darker, more saturated composite color relative to the original colors. Thus, the expected darker appearance of the cyan intersection in the original example would indeed occur.

The approach described above is a good first order approximation which assumes that the change in effective thickness of each colorant is a fixed value. If a more realistic adjustment is assumed, namely that the proportional change in thickness for each colorant is constant rather than the absolute magnitude of change in thickness, a slightly more complex calculation may be performed to estimate how the resulting overprint colors varies with changes in individual colorant, in the manner shown below.

Equation 4 is rewritten to indicate proportional change in thickness rather than absolute change in thickness:

$$z_i' = z_i(1+\delta_i) \qquad \text{Eq. 16}$$

which now leads to:

$$T_{ij}(z_i, \delta_i) = e^{-k_{ij}z_i(1+\delta_i)}$$

$$T_{ij}(z_i, \delta_i) = T_{ij}(z_i)^{(1+\delta_i)} \qquad \text{Eq. 17}$$

If it is assumed that baseline data contains CIELAB data for paper base, colorants, and overprints, the expression above may be rewritten in terms of a product of the reflectance of the baseline paper substrate and the negative exponentials of the colorant absorptions, modified by corrections caused by $\Delta z$ above:

$$R_j(z_0, \delta_0, z_1, \delta_1, z_2, \delta_2, z_3, \delta_3) = R_{gi} \prod_{i=0}^{i=3} T_{ij}^{(1+\delta_i)}(z_i) \qquad \text{Eq. 18}$$

Assuming that the value of transmission for a particular colorant will always be determined via measurement of paper and individual colorant printing on that paper, the above may further be simplified as functions purely of the reflection of paper and the empirically determined transmissions of each of the colorants, corrected by the overall delta for that particular combination of colorants:

$$R_j(\delta_0, \delta_1, \delta_2, \delta_3) = R_{gj} \prod_{i=0}^{i=3} T_{ij}^{(1+\delta_i)} \quad \text{Eq. 19}$$

$$\log[R_j(\delta_0, \delta_1, \delta_2, \delta_3)/R_{gj}] = \sum_{i=0}^{i=3} \log\left[T_{ij}^{(1+\delta_i)}\right]$$

$$\sum_{i=0}^{i=3} (1+\delta_i)\log[T_{ij}] = \log[R_j(\delta_0, \delta_1, \delta_2, \delta_3)/R_{gj}] \quad \text{Eq. 20}$$

$$\sum_{i=0}^{i=3} \delta_i \log[T_{ij}] = \log[R_{jMeas}/R_{gj}] - \sum_{i=0}^{i=3} \log[T_{ij}]$$

This calculation is now reduced to a set of 3 linear equations with 4 unknowns. If the case of 4 color black overprint is ignored, which has little impact on color due to its high density and low chroma, the values of all the other overprint colors may uniquely be calculated since at least one of the 4 colors in each overprint is not present, which equates to T=1, and log [T]=0, δi=0 for that non-present colorant or colorants. The vector δi may hence be calculated from standard solutions to 3 linear equations with 3 unknowns (similar for 2 colorant overprints—2 equations with 2 unknowns):

$$\begin{pmatrix} \delta_0 \\ \delta_1 \\ \delta_2 \end{pmatrix} = M^{-1} \begin{pmatrix} \alpha_0 \\ \alpha_1 \\ \alpha_2 \end{pmatrix} \quad \text{Eq. 21}$$

where 0, 1, 2 each temporarily denote cyan, magenta, yellow, or black and represent three out of the four colorants present in the overprint color. The 4 color overprint may be handled in an approximate manner using the value Δ as described earlier in this document. The values of $\alpha_j$ are given by:

$$\alpha_j = \log[R_{jmeas}/R_{gi}] - \sum_{i=0}^{i=3} \log[T_{ij}] \quad \text{Eq. 22}$$

$$M_{ij} = \log[T_{ij}]$$

Having determined these more complex and more accurate values of the deltas, the user may recalculate the vectors $R_j$ for new values of paper and colorants by measuring paper and colorant XYZ and converting to RGB in order to determine $R_{gi}$ and $T_{ij}$. Having recalculated the $R_j$ vector, one may convert back to predicted XYZ.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

What is claimed is:

1. A computer-implemented method comprising:
    converting baseline data for a paper base and a set of colorants from a device-independent color space to discrete visible spectrum approximations;
    generating transmittance vectors for the set of colorants by normalizing device-dependent values for the set of colorants to remove colorimetric effects of the paper base from the set of colorants;
    wherein the baseline data further includes overprint data for one or more colorant combinations; and
    further comprising determining correction factors for the overprint data based on estimated thickness adjustments of the one or more colorant combinations, wherein the estimated thickness adjustments account for colorant bonding differences of colorants deposited upon other colorants relative to colorants deposited directly on the paper base.

* * * * *